United States Patent
Kaminski

Patent Number: 6,023,402
Date of Patent: Feb. 8, 2000

[54] SOFTWARE CONTROLLED FAN WITH HARDWARE FAIL-SAFE RESTART

[75] Inventor: George A. Kaminski, Houston, Tex.

[73] Assignee: Compact Computer Corporation, Houston, Tex.

[21] Appl. No.: 09/021,906

[22] Filed: Feb. 11, 1998

[51] Int. Cl.[7] .................................................. H02H 5/04
[52] U.S. Cl. ........................... 361/103; 361/71; 361/20; 361/59; 361/78; 361/103; 361/106; 361/683; 361/687; 361/695; 361/694; 307/116; 307/117
[58] Field of Search ................................ 361/71, 20, 59, 361/78, 103, 106, 683, 687, 695, 694; 307/116, 117; 364/528.34, 528.35, 528.27, 528.28

[56] References Cited

U.S. PATENT DOCUMENTS

| | | | |
|---|---|---|---|
| 5,121,291 | 6/1992 | Cope et al. | 361/384 |
| 5,436,827 | 7/1995 | Gunn et al. | 364/187 |
| 5,469,320 | 11/1995 | Walker et al. | 361/33 |
| 5,513,361 | 4/1996 | Young | 395/750 |
| 5,574,667 | 11/1996 | Dinh et al. | 364/557 |
| 5,631,800 | 5/1997 | Jin et al. | 361/103 |
| 5,687,079 | 11/1997 | Bauer et al. | 364/175 |
| 5,726,874 | 3/1998 | Liang | 363/141 |
| 5,727,928 | 3/1998 | Brown | 417/44.11 |

OTHER PUBLICATIONS

"110 Alert™" by PC Power & Cooling, Inc., www.pcpowercooling.com/110–Alert.htm. (Date Unknown).

*Primary Examiner*—Jeffrey Gaffin
*Assistant Examiner*—Kim Huynh
*Attorney, Agent, or Firm*—Robert Groover

[57] ABSTRACT

A control circuit for the regulation of fan speed control in a computer power supply with software controlled shutdown and automatic restart for over-temperature protection. The control circuit overrides the control inputs when the temperature inputs indicate a temperature above a specific level.

23 Claims, 3 Drawing Sheets

SOFTWARE CONTROLLED FAN WITH HARDWARE FAIL-SAFE RESTART

BACKGROUND AND SUMMARY OF THE INVENTION

The application relates to smart cooling systems in computer power supplies.

Background: Thermal Requirements

With the increase in packaging density of devices in computer products, the control of the thermal environment inside the chassis has become a critical part of the design process in order to maintain system stability and reliability. Heat-generating components, modules, and boards are packaged ever more densely to reduce the chassis volume, resulting in a more concentrated thermal load. This "technological advancement" causes additional headaches for designers adding components into the computer chassis.

An inferior cooling design can cause power supply circuit components to operate at abnormal temperatures. Without proper air circulation, heat builds up inside the computer chassis. Circuit components operating in temperatures not within design specifications may cause RF interference, rebooting, hard drive errors, and other undesirable consequences affecting the integrity of the system. Additionally, over time, sensitive components such as the CPU or hard drive may undergo physical damage from excessive expansion and contraction due to thermal dynamics of the system.

Since a power supply is a large concentrated source of heat, a cooling fan is normally designed into the power supply chassis, to exhaust the warm air from the computer chassis itself and to draw the air across power supply components as the air exits the system. Cooling fans are low-cost mechanical devices that fail more often than any other system component. Since a cooling fan failure is often masked by background noise (hard drive noise), the problem becomes apparent only when irregularities begin to occur in operation or when a total system failure occurs.

Background: Fan Redundancy

As a result, computer power supply companies are seeking a variety of more cost effective methods for enhancing power supply performance and reliability. For example, vendors may design redundant supplies into a single power supply module to enhance the reliability and integrity of the mother system. This particular design enhancement adds to the thermal load and overall cost of the system. In conjunction with this design, several fans may be added to control the excess heat. Another approach provided in the industry is to connect an audible over-temperature alarm to a spare power supply plug (110 Alert™ by PC Power & Cooling, Inc.). However, this alternative offers only "coarse" control over the thermal problems associated with enclosed electronics. Temperature fluctuations may still be excessive causing physical damage to component structures from thermal expansion/contraction.

Background: Power Efficiency

With a steady increase in energy consumption occurring in the United States, the Environmental Protection Agency ("EPA") has developed a program to help curb this usage. The EPA's Energy Star Program is a voluntary partnership with the computer industry to promote the introduction of energy-efficient personal computers, monitors, and printers in an effort to reduce air pollution caused by power generation. Note that Energy Star does not apply directly to power supplies, but to the computer systems in which the supplies reside. However, many companies strive to meet the spirit of the program, and consumers are demanding it by what they purchase. Many vendors simply design the power supply fan to rotate at a fixed speed, but in this case the fan's constant operation wastes energy. Other vendors may design the fan to run proportionately to the temperature in a linear relationship.

Software Controlled Fan With Hardware Fail-safe

This application provides an innovative architecture for cooling control which regulates fan speed in accordance with temperature and allows the computer system to turn the fan off to conserve power when the computer is "asleep" or in a low activity state. To ensure that the fan was not turned off during a high activity mode (when the computer is consuming significant energy and therefore producing considerable heat), this circuit will automatically restart the fan, without any command from the system, when the power supply temperature reaches a critical level. This feature also protects the computer and power supply from catastrophic failure if the fan is erroneously turned off.

An advantage of the preferred embodiment is that the circuit was designed with very common, readily available, low cost components. This circuit was designed with ordinary transistors, diodes and resistors, small low voltage capacitors, and only one integrated circuit.

Another advantage is that the fan speed is regulated to more closely control the temperature profile. The control circuit can precisely regulate fan speeds, as determined by the ambient temperature to guarantee the required thermal environment. Since the fan may be controlled at a minimum necessary speed, the power dissipated by the fan is reduced. Additionally, a reduction in acoustic noise, vibration, and wear inside the fan is realized.

Another advantage is that the fan in the power supply can be turned off, saving energy. This allows the computer system to be certified as ENERGY START™ compliant.

Another advantage is that this circuit protects the computer from catastrophic failure in the event that the fan is erroneously turned off. Thus the flexibility of software-controlled operation can be obtained while still realizing very robust fail-safe operation.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Operational Overview

Figure 4:
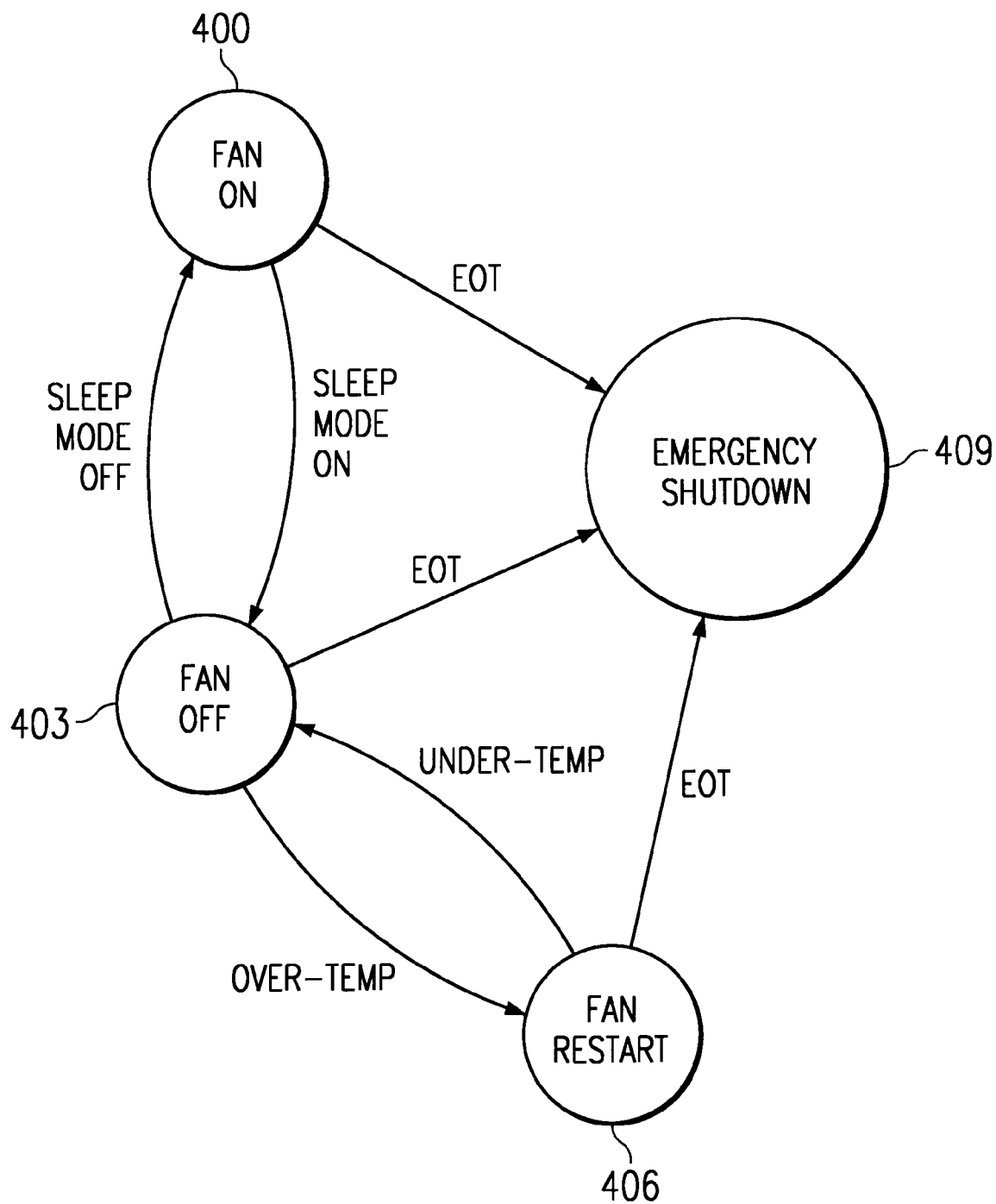
FIG. 4 shows a state diagram for the method of controlling the cooling fan.

FIG. 4 shows a state diagram for the method of controlling the cooling fan. During normal operation, when the user first powers-up the system, the fan turns on. A thermistor circuit provides control of the fan speed relative to the temperature. During extended periods of system inactivity, the computer may enter a "sleep" mode. When in sleep mode, the fan is commanded OFF (state 403). When the computer reenters normal mode operation from sleep mode, the command to turn the fan OFF is removed, and the fan turns ON (state 400). In fault mode, where the fan has erroneously been commanded OFF, the control circuit comprises a fail-safe feature to cycle the fan on and off (state 406) repeatedly to maintain the desired temperature within the chassis. The fan is restarted (state 406) in order to reach an under-temperature state, at which time the fan is again turned off (state 403). If for some reason the temperature reaches an Emergency Over-Temperature ("EOT") (state 409) (for example, due to a blocked rotor or other total fan failure), the circuit can be configured to shutdown the power supply, averting a destructive failure of supply components and/or system components. The EOT condition can occur at any time, but the circuit will perform an emergency shutdown of the power supply under all circumstances of thermal runaway. Otherwise, the circuit simply continues to operate and regulate the fan speed as necessary to maintain a controlled thermal environment for the system. The circuit is designed to ensure that the fan is not erroneously turned off during high energy dissipation events, but will restart the fan when a critical temperature is reached.

Preferred Circuit Embodiment

The innovative circuit regulates the fan speed in dependence upon temperature and allows the computer system to turn the fan off to conserve power when the computer is in "sleep" mode or in a low activity state.

Figure 1:
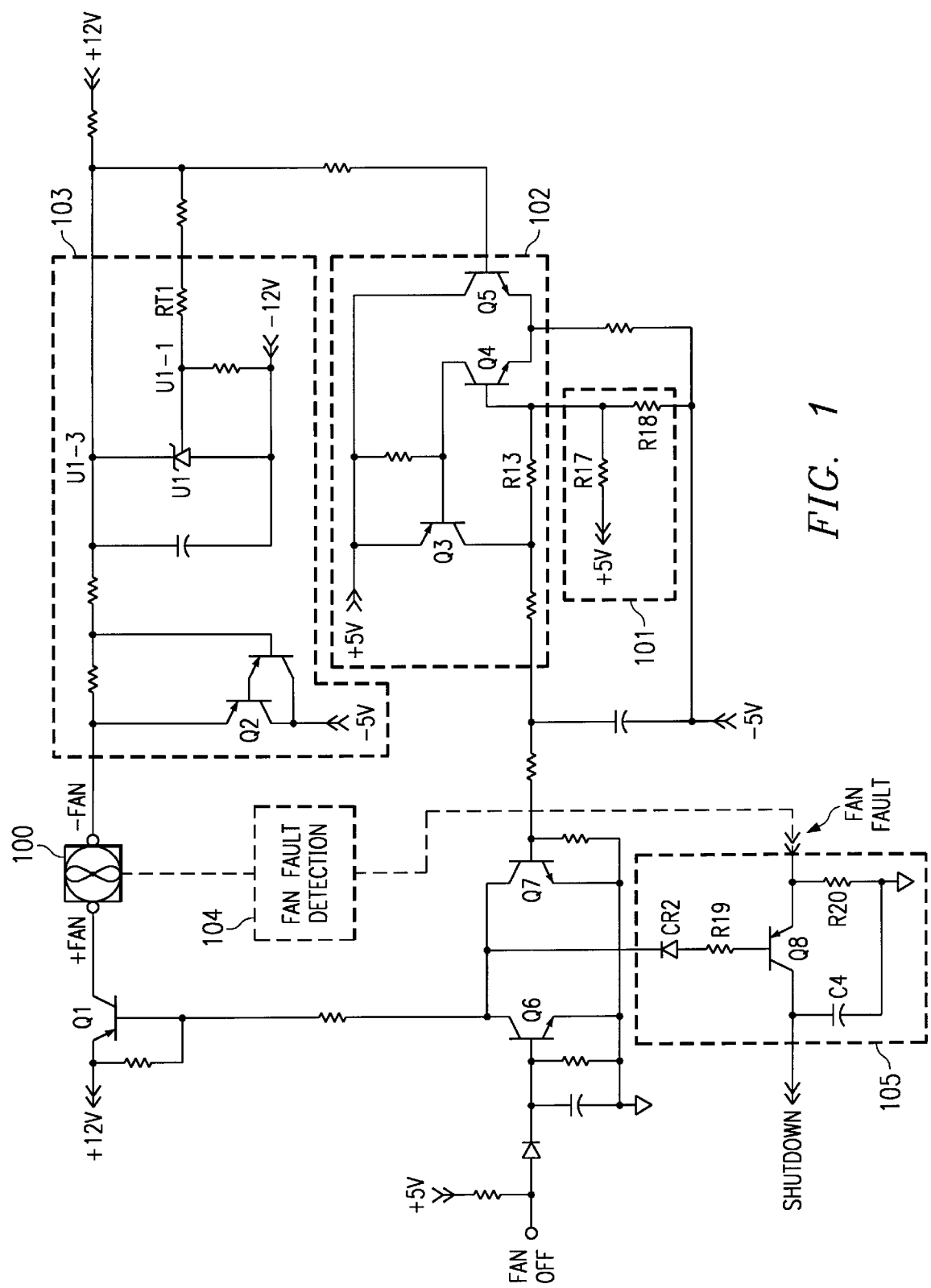
FIG. 1 shows a circuit diagram of the presently preferred embodiment.

FIG. 1 shows a circuit diagram of the presently preferred embodiment. The fan 100 is controlled by, for example, an open collector TTL input, FAN OFF. When the FAN OFF signal is not grounded, transistors Q6 and Q1 are on. This connects +12 V to the positive side (+FAN) of the fan 100. The fan 100 can be turned off by grounding the FAN OFF input. Consequently, both transistors Q6 and Q1 are off and the fan 100 is disconnected from +12 V.

The negative side (−FAN) of the fan 100 is regulated to a voltage based upon the temperature by circuit 103. This is accomplished by voltage reference U1, thermistor RT1, and the power darlington transistor pair Q2. Thermistor RT1 has a negative temperature coefficient and is attached to the hottest or most critical device in the power supply. As temperature in the power supply chassis increases, the thermistor RT1 resistance decreases. The voltage at node U1-3 of voltage reference U1 becomes more negative. This turns transistor Q2 on harder and causes the voltage at the −FAN terminal to become more negative. As the voltage applied to the fan 100 increases, a corresponding increase in fan speed draws more cooler air through the chassis. When the power supply chassis temperature decreases, the thermistor RT1 temperature decreases which increases its resistance. The voltage at node U1-3 becomes more positive. This decreases the transistor Q2 base voltage, and thus the voltage at the −FAN terminal decreases. As a result of the decrease in voltage applied to the fan 100, reduced rotational speed of the fan 100 reduces air flow.

When the fan 100 is shut off (FAN OFF grounded), voltage reference U1 is still producing an output that is related to temperature. The reference output U1-3 is an input to the discrete comparator 102 consisting of transistors Q3, Q4, and Q5. This voltage is compared to a reference 101 derived from resistances R17, R18, and +/−5 V. If the temperature increases such that the voltage at node U1-3 becomes more negative than the reference voltage at the base of transistor Q4, transistors Q3 and Q4 turn on while transistor Q5 turns off. Resistance R13 provides hysteresis to ensure that the comparator switches cleanly. Once transistor Q3 turns on, transistor Q7 is able to turn transistor Q1 back on. This turns the fan 100 back on by reconnecting it to the +12 V source. As air flow cools the power supply and thermistor RT1, the voltage at U1-3 becomes more positive. When this voltage is greater than the voltage at the base of transistor Q4, transistor Q5 turns on, and transistors Q1, Q3, Q4, and Q7 turn off. This disconnects the +12 V source from the fan 100, turning it off. Thus, the fan 100 will cycle on/off as the temperature rises and falls. The temperature is regulated to a safe level even if the fan 100 is commanded off when FAN OFF is grounded.

If circuitry 104 is added to detect fan faults (high fan voltage, blocked rotor, etc.), this signal can be applied to the FAN FAULT input. If enabled, this signal can be applied to the power supply SHUTDOWN circuitry 105 to turn the power supply off to prevent catastrophic failure. This shutdown signal is enabled by the circuitry 105 composed of diode CR2, resistances R19 and R20, transistor Q8, and capacitor C4. If the fan is on, transistors Q6 and/or Q7 are on. Diode CR2 is forward biased and transistor Q8 is turned on. If a FAN FAULT input is present, transistor Q8 passes the signal to the SHUTDOWN output. If the fan 100 is off, transistors Q6 and Q7 are off. Diode CR2 is reversed biased and transistor Q8 is off. Thus a FAN FAULT signal is not passed on the SHUTDOWN output. This prevents the power supply from being shutdown when the fan 100 is commanded off.

Sample Power System Application

Figure 2:
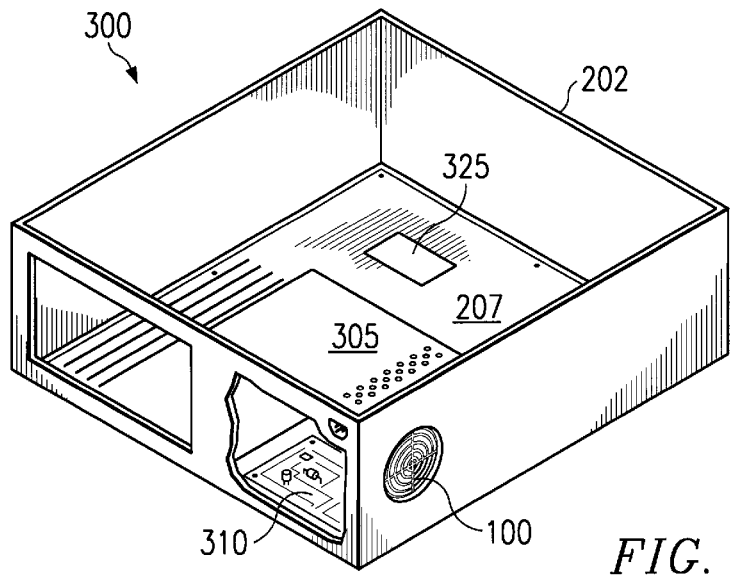
FIG. 2 shows a physical diagram of a computer system with a power supply incorporating the innovative control circuitry.

FIG. 2 shows a physical diagram of a computer system with a power supply incorporating the innovative control circuitry. Computer system 300 is enclosed with a chassis 202 and, in this example, comprises a power supply module 305 which includes the innovative cooling fan speed control circuitry 310. The circuitry 310 connects to the cooling fan 100 controlling fan speed in relation to the temperature inside the chassis 202. The computer system board 207 comprises, among other chips, a microprocessor 325 which interfaces to the control circuitry 310. Software control of the cooling fan 100 via the computer operating system is possible since the control circuitry 310 interfaces with the microprocessor 325.

Figure 3:
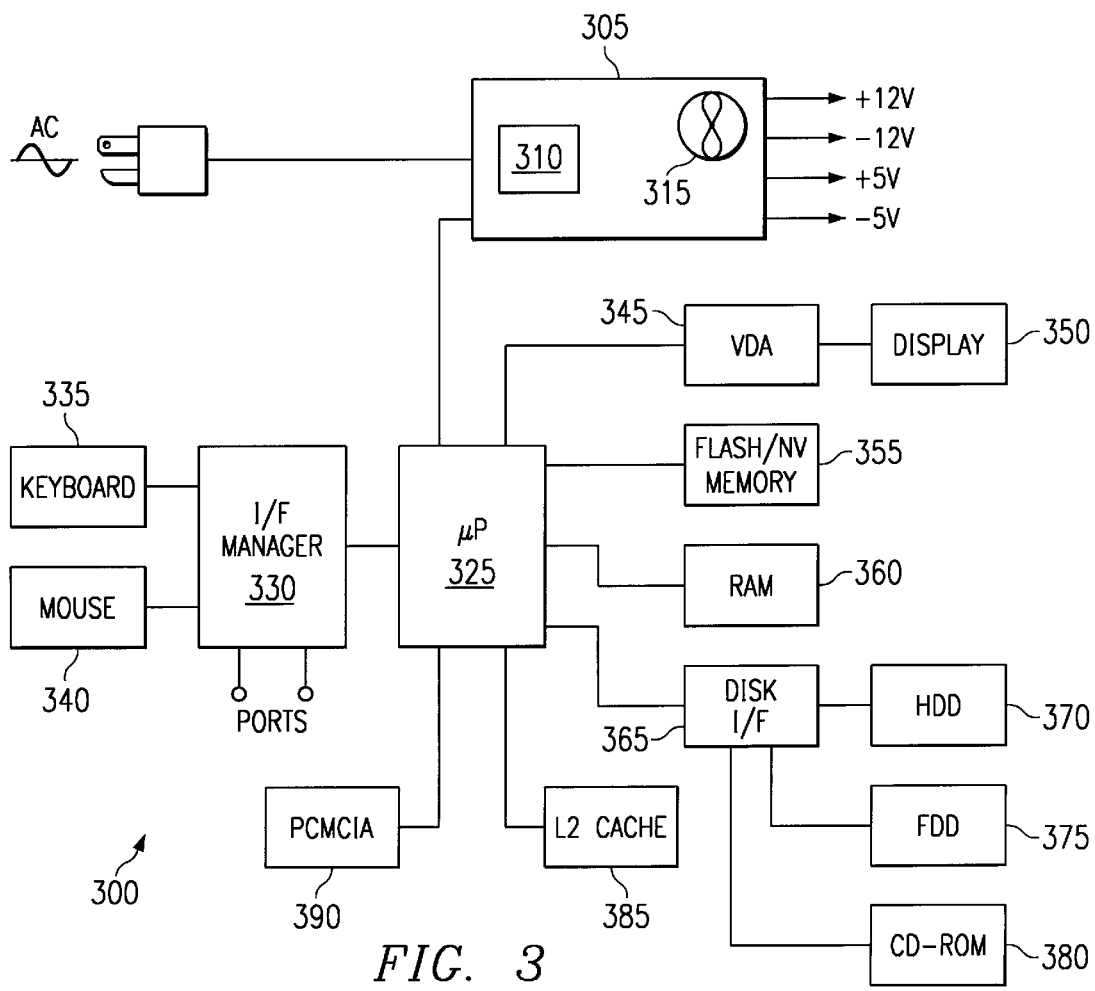
FIG. 3 shows a block diagram of a computer system according to the presently preferred embodiment.

FIG. 3 shows a block diagram of a computer system 300 according to the presently preferred embodiment. In this example, the computer system, includes:

user input devices (e.g. keyboard 335 and mouse 340);

at least one microprocessor 325 which is operatively connected to receive inputs from said input device, through an interface manager chip 330 (which also provides an interface to the various ports);

a power supply 305 which is connected to draw power from AC mains and provide DC voltage to the computer system 300 components; the innovative power supply control circuit 310, located within the power supply 305, connects to fan 100 and also interfaces to the microprocessor 325;

a memory (e.g. flash or non-volatile memory 355 and RAM 360), which is accessible by the microprocessor;

a data output device (e.g. display 350 and video display adapter card 345) which is connected to output data generated by microprocessor; and a magnetic disk drive 370 which is read-write accessible, through an interface unit 365, by the microprocessor.

Optionally, of course, many other components can be included, and this configuration is not definitive by any means. For example, the computer may also include a CD-ROM drive 380 and floppy disk drive ("FDD") 375 which may interface to the disk interface controller 365. Additionally, L2 cache 385 may be added to speed data access from the disk drives to the microprocessor, and a PCMCIA 390 slot accommodates peripheral enhancements.

Alternative Embodiment: Other Computer and Electronic Systems

According to disclosed class of alternative embodiments the innovative control method may be applicable to other electronic systems which use "smart" power-managing systems and use fans for cooling environments and components.

According to a disclosed class of innovative embodiments, there is provided: a computer power supply system, comprising: a fan; and a control circuit connected to receive control and temperature inputs and to control said fan accordingly; wherein said control inputs can cause said control circuit to turn off said fan under at least some circumstances; and wherein said control circuit automatically reapplies power to said fan after turning off said fan, if said temperature input indicates a temperature which is above a certain level.

According to another disclosed class of innovative embodiments, there is provided: a computer power supply system, comprising: a fan; and a control circuit connected to receive control and temperature inputs and to control said fan accordingly; wherein said control inputs can cause said control circuit to turn off said fan under at least some circumstances; and wherein said control circuit automatically reapplies power to said fan after turning off said fan, if said temperature input indicates a temperature which is above a certain level; wherein said control circuit receives said control inputs from a microprocessor.

According to another disclosed class of innovative embodiments, there is provided: a method for controlling a cooling fan in a complex electronic system, comprising the steps of: (a.) turning on said fan when powering up said system; (b.) turning off said fan in response to a command from a system processor, if and only if the temperature is below a certain level; and (c.) automatically restarting said fan after said step (b.), even without a command from the system, whenever the temperature of said system reaches said certain level.

According to another disclosed class of innovative embodiments, there is provided: a computer system, comprising: a user input device, a microprocessor which is operatively connected to detect inputs from said input device, random-access memory which is connected to be read/write accessible by said microprocessor, and an output device operatively connected to receive outputs from said microprocessor; and a power supply connected to provide power to said microprocessor and said memory, and comprising a fan; and a control circuit connected to detect temperature and control said fan accordingly; wherein said fan is commanded off under at least some circumstances to conserve energy when the temperature is below a certain level; wherein said control circuit automatically applies power to said fan, even after receiving said command to turn off, when the temperature is above said certain level; wherein said control circuit communicates with a digital input from said microprocessor.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It should also be noted that the disclosed innovative ideas are not by any means limited to systems where the managing microcontroller is not the CPU.

It should also be noted that the disclosed innovative ideas are not by any means limited to power supply cooling systems, but can also be implemented for CPU cooling fans.

It should also be noted that the disclosed innovative ideas are not by any means limited to systems with a single fan, but can also be implemented in systems with multiple fans.

It should also be noted that the disclosed innovative ideas may also be applicable to systems where the fan speed is dependent on temperature and is not necessarily linear, but variable in nature.

It should also be noted that the disclosed innovative ideas may also be applicable for other temperature sensor placements besides the single varistor.

It should also be noted that the disclosed innovative ideas may be designed into an ASIC with other system functions.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

It should also be noted that the disclosed innovative ideas are not limited only to Windows, DOS or UNIX systems, but can also be implemented in other operating systems.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas may be implemented with notebook computers.

It should also be noted that the disclosed innovative circuit may further comprise circuitry to send a command to a processor to shutdown the system.

What is claimed is:

1. A computer power supply system, comprising:
   a fan; and
   a control circuit connected to receive a control input and a temperature input and to control said fan;

wherein said control circuit is connected to turn on said fan when said temperature input indicates a temperature above a specified level;

wherein said control circuit is connected to turn said fan on and off in response to said control input when said temperature input does not indicate a temperature above said specified level.

2. The system of claim 1, wherein said control circuit is connected to control said fan such that fan speed increases with rising temperature, and decreases with falling temperature.

3. The system of claim 1, wherein said control circuit is further connected to block a fan failure signal whenever said fan has been turned off.

4. The system of claim 1, wherein said control circuit further comprises circuitry connected to shut down said power supply when said fan fails.

5. The system of claim 1, wherein said control circuit is connected to receive said control inputs from a system microprocessor.

6. The system of claim 1, wherein said control circuit is connected to cycle said fan on and off repeatedly to maintain a temperature below said specified level.

7. The system of claim 1, wherein said control circuit is connect to receive said control inputs from a microprocessor, and wherein said microprocessor is connected to command said fan to turn off when said system is in a sleep mode.

8. The system of claim 1, wherein said control circuit resides within said power supply.

9. A computer power supply system, comprising:

a fan; and a control circuit connected to receive control inputs from a microprocessor and to turn said fan on and off in response to said control inputs;

wherein said control circuit is further connected to receive temperature inputs and to override said control inputs when said temperature inputs indicate a temperature above a specified level.

10. The system of claim 9, wherein said control circuit is connected to operate said fan such that fan speed increases with rising temperature, and decreases with falling temperature.

11. The system of claim 9, wherein said control circuit is also connected to block a fan failure signal whenever said fan has been turned off.

12. The system of claim 9, wherein said control circuit is connect to cycle said fan on and off repeatedly to maintain a temperature below said specified level.

13. The system of claim 9, wherein said control circuit resides within said power supply.

14. A method for controlling a cooling fan in an electronic system, comprising the steps of:

(a.) turning on said fan when powering up said system;

(b.) turning off said fan in response to a command from a system processor, if and only if the temperature is below a certain level; and (c.) automatically restarting said fan after said step (b.), even without a command from the system, whenever the temperature of said system reaches said certain level.

15. The method of claim 14, wherein during said step (a.) said fan is operated at a speed which increases with rising temperature, and decreases with falling temperature.

16. The method of claim 14, wherein said step (c.) is performed by a control circuit which further comprises circuitry to shut-down said power supply when said fan fails.

17. The method of claim 14, wherein said system processor is a microprocessor.

18. The method of claim 14, wherein said step (c.) is performed by a control circuit which resides within said power supply.

19. A computer system, comprising:

a user input device, a microprocessor which is operatively connected to detect inputs from said input device, random-access memory which is connected to be read/write accessible by said microprocessor, and an output device operatively connected to receive outputs from said microprocessor; and a power supply connected to provide power to said microprocessor and said memory, and comprising a fan; and a control circuit which is connected to communicate with an input from said microprocessor and to turn said fan on and off in response to communications from said microprocessor;

wherein said control circuit is connected to detect temperature and to override said communications from said microprocessor and turn said fan on when the temperature is above a specified level.

20. The system of claim 19, wherein said control circuit is connected to increase the speed of said fan with a rise in temperature, and to increase the speed of said fan with a fall in temperature.

21. The system of claim 19, wherein said control circuit further comprises circuitry connected to shutdown said power supply when said fan fails.

22. The system of claim 19, wherein said fan is connected to be commanded on or off by said microprocessor.

23. The system of claim 19, wherein said control circuit resides within said power supply.

* * * * *